US011789703B2

(12) United States Patent
Jariwala (10) Patent No.: US 11,789,703 B2
(45) Date of Patent: Oct. 17, 2023

(54) BLOCKCHAIN-BASED SOURCE CODE MODIFICATION DETECTION AND TRACKING SYSTEM AND METHOD FOR ARTIFICIAL INTELLIGENCE PLATFORMS

(71) Applicant: Hearsch Jariwala, Cary, NC (US)

(72) Inventor: Hearsch Jariwala, Cary, NC (US)

( * ) Notice: Subject to any disclaimer, the term of this patent is extended or adjusted under 35 U.S.C. 154(b) by 0 days.

(21) Appl. No.: 17/509,811

(22) Filed: Oct. 25, 2021

(65) Prior Publication Data
US 2022/0405061 A1   Dec. 22, 2022

Related U.S. Application Data

(60) Provisional application No. 63/212,996, filed on Jun. 21, 2021.

(51) Int. Cl.
*G06F 8/30* (2018.01)
*G06F 11/36* (2006.01)
(52) U.S. Cl.
CPC ............ *G06F 8/30* (2013.01); *G06F 11/3636* (2013.01)
(58) Field of Classification Search
CPC .............................. G06F 8/30; G06F 11/3636
USPC ................................ 706/12–45; 717/106–140
See application file for complete search history.

(56) References Cited

U.S. PATENT DOCUMENTS

| | | | |
|---|---|---|---|
| 10,572,684 B2 | 2/2020 | LaFever et al. | |
| 10,579,368 B2 | 3/2020 | Wisnovsky | |
| 10,671,302 B1 * | 6/2020 | Aggarwal | G06F 3/067 |
| 10,783,277 B2 * | 9/2020 | Li | G06F 21/6272 |
| 11,216,750 B2 * | 1/2022 | Celia | G06Q 40/04 |
| 11,244,032 B1 * | 2/2022 | Nguyen | G06Q 20/1235 |
| 11,321,718 B1 * | 5/2022 | Narendranathan | G06F 21/64 |
| 11,481,268 B2 * | 10/2022 | Jiang | G06F 11/0751 |
| 11,481,583 B2 * | 10/2022 | Smith | G06V 10/20 |
| 11,611,440 B2 * | 3/2023 | Khatib | G06F 18/2148 |

(Continued)

FOREIGN PATENT DOCUMENTS

WO          202001858          1/2020

OTHER PUBLICATIONS

Pandl et al, "On the Convergence of Artificial Intelligence and Distributed Ledger Technology: A Scoping Review and Future Research Agenda", IEEE, pp. 57075-57095 (Year: 2020).*

(Continued)

*Primary Examiner* — Anil Khatri
(74) *Attorney, Agent, or Firm* — John Rizvi; John Rizvi, P.A.-The Patent Professor®

(57) ABSTRACT

A system and method for detecting and tracking source code changes in an artificial intelligence black box application using a blockchain DLT. Each block of the blockchain DLT incorporates a plug-in that is triggered when a source code change is made within an AI black box during program execution across an AI platform. Each time the plug-in is triggered indicating source changes are being made by the AI platform's black box a detection and tracking of such changes is recorded in the blockchain DLT as a new block. The specific source code changes are copied and written directly into the new block created and inserted into the blockchain DLT. At the same time, the number of source code modified (i.e., added, deleted and/or reorganized) are determined (i.e., counted) and relevant information identified specific to the modified source code is recorded.

16 Claims, 8 Drawing Sheets

(56) References Cited

U.S. PATENT DOCUMENTS

| | | | | |
|---|---|---|---|---|
| 11,620,580 | B2* | 4/2023 | Mahna | G06N 20/00 706/12 |
| 11,626,988 | B2* | 4/2023 | Sekar | G06N 20/00 713/168 |
| 11,664,099 | B1* | 5/2023 | Jain | G16H 10/60 705/2 |
| 2003/0009744 | A1* | 1/2003 | Doyle | G06F 8/423 717/120 |
| 2005/0216898 | A1* | 9/2005 | Powell | G06F 16/80 717/114 |
| 2014/0096113 | A1 | 4/2014 | Kuehlmann et al. | |
| 2017/0222814 | A1 | 8/2017 | Oberhauser et al. | |
| 2019/0236598 | A1 | 8/2019 | Padmanabhan | |
| 2019/0238316 | A1 | 8/2019 | Padmanabhan | |
| 2019/0332921 | A1 | 10/2019 | Rodriguez | |
| 2019/0377883 | A1 | 12/2019 | Wasiq et al. | |
| 2020/0099513 | A1 | 3/2020 | Angelo et al. | |
| 2020/0250177 | A1* | 8/2020 | Padmanabhan | G06F 16/27 |
| 2020/0250683 | A1 | 8/2020 | Padmanabhan et al. | |
| 2020/0252406 | A1 | 8/2020 | Padmanabhan et al. | |
| 2021/0036970 | A1 | 2/2021 | Ivkushkin et al. | |
| 2022/0067738 | A1* | 3/2022 | Fang | G06Q 20/0655 |

OTHER PUBLICATIONS

Baqa et al, "Semantic Smart Contracts for Blockchain-based Services in the Internet of Things", IEEE, pp. 1-5 (Year: 2019).*

Vyas et al, "Converging Blockchain and Machine Learning for Healthcare", IEEE, pp. 1-3 (Year: 2019).*

Yuan et al, "Equipment Supply Chain Financial Collaborative Innovation Service Based on Distributed Ledger Technology", ACM, pp. 48-52 (Year: 2019).*

Deshmukh et al, "Recent Trends on Blockchain for Internet of Things based Applications: Open Issues and Future Trends", ACM, pp. 484-492 (Year: 2022).*

Lobo et al, "Convergence of Blockchain and Artificial Intelligence to Decentralize Healthcare Systems", IEEE, pp. 1-7 (Year: 2020).*

Ojha et al, "Potential usage of AI in Blockchain Technology", IEEE, pp. 7-8 (Year: 2023).*

* cited by examiner

BLOCKCHAIN-BASED SOURCE CODE MODIFICATION DETECTION AND TRACKING SYSTEM AND METHOD FOR ARTIFICIAL INTELLIGENCE PLATFORMS

CROSS-REFERENCE TO RELATED APPLICATION

This application claims the benefit of U.S. Provisional Application 63/212,996, filed Jun. 21, 2021, which is hereby incorporated by reference herein in its entirety.

FIELD OF THE INVENTION

The present invention relates generally to artificial intelligence platforms, and more particularly, to a system and method that facilitate the detection and tracking of source code modifications resulting from black box artificial intelligence.

BACKGROUND OF THE INVENTION

Artificial intelligence (AI) refers to the simulation of human intelligence in machines that are programmed to think like humans and mimic their actions. The term may also be applied to any machine that exhibits traits associated with a human mind such as learning and problem-solving. As such, AI is intelligence demonstrated by machines, unlike the natural intelligence displayed by humans and animals, which involves consciousness and emotionality. Artificial intelligence is typically divided into two different categories: weak and strong. Weak artificial intelligence embodies a system designed to carry out one particular job. Weak AI systems include video games such as a chess gaming application and personal assistants such as Amazon's Alexa and Apple's Siri. Strong artificial intelligence systems are systems that carry on the tasks considered to be human-like. These tend to be more complex and complicated systems. They are programmed to handle situations in which they may be required to problem solve without having a person intervene.

In AI there is a defined field of study directed to so-called "intelligent agents", that is, any device that perceives its environment and takes actions that maximize its chance of successfully achieving its goals. Colloquially, the term "artificial intelligence" is often used to describe machines that mimic "cognitive" functions that humans associate with the human mind, such as "learning" and "problem solving" The ideal characteristic of artificial intelligence is its ability to rationalize and take actions that have the best chance of achieving a specific goal. A subset of artificial intelligence is machine learning, which refers to the concept that computer programs can automatically learn from and adapt to new data without being assisted by humans. Deep learning techniques enable this automatic learning through the absorption of huge amounts of unstructured data such as text, images, or video.

The applications for artificial intelligence are endless. The technology can be applied to many different sectors and industries. AI is being tested and used in the healthcare industry for dosing drugs and different treatment in patients, and for surgical procedures in the operating room. Other examples of machines with artificial intelligence include computers that play chess and self-driving cars. Each of these machines must weigh the consequences of any action they take, as each action will impact the end result. In chess, the end result is winning the game. For self-driving cars, the AI system must account for all external data and make computations for the car to act and react in a way that prevents a collision. Artificial intelligence also has applications in the financial industry, where it is used to detect and flag activity in banking and finance such as unusual debit card usage and large account deposits that may be used to assist a bank's fraud department. Applications for AI are also being used to help streamline and make stock and security trading easier and more efficient.

An important and emerging issue in AI is understanding and optimizing so-called "black box" data and systems. Black box AI is any artificial intelligence system whose inputs and operations are not visible to the user, or another interested party. A black box, in a general sense, is an impenetrable system. This AI process is largely self-directed and is generally difficult for data scientists, programmers, and users to interpret. In short, a black box is a system which can be viewed in terms of its inputs and outputs (or transfer characteristics), without any knowledge of its internal workings. In this sense, the system's implementation is "opaque" (i.e., black). To analyze an open system with a typical "black box approach", only the behavior of the stimulus/response will be accounted for, to infer the unknown black box. The usual representation of this black box system is a data flow diagram centered in the box having an input and an output.

For example, deep learning modeling is typically conducted through black box development. The AI algorithm takes millions of data points as inputs and correlates specific data features to produce an output. That process is largely self-directed and is generally difficult for humans to interpret. The most common tools to suffer from the black box problem are those that use artificial neural networks and/or deep learning. Artificial neural networks consist of hidden layers of nodes. These nodes each process the given input and pass their output to the next layer of nodes. Deep learning is a huge artificial neural network, with many of these hidden layers, and it "learns" on its own by recognizing patterns. This sometimes translates into modifications (e.g., additions or deletions) to the underlying source code made by the AI algorithm. As will be appreciated, this can become infinitely complicated depending upon the application. The programmer or system developer, for example, cannot see what the nodes have 'learned' and do not see the output between layers and/or the specific source code modifications, only the conclusion and outputs. As such, they cannot know how the nodes are analyzing the data, changing source code, and are therefore faced with the classic AI black box problem.

Thus, black box AI produces results without explanation, and consequently they make detection of inappropriate decisions difficult. This exposes certain system vulnerabilities, such as biased data, unsuitable modeling techniques, and incorrect decision making, in the algorithm life cycle. For example, in a self-driving automobile, the AI system employs a massive amount of data and deep learning techniques to pilot the car through traffic. Traffic navigation itself presents certain black box questions such "why did the car go off road?" that are critical to understand. Unfortunately, the answer to such a question is difficult unless the programmer has a complete history of the changes that occurred within the AI platform. As AI algorithms become more powerful, pervasive, and sophisticated, the methods for monitoring and troubleshooting them in terms of their black box data becomes increasingly important and challenging. The ability to detect and track changes made to the original or underling source code by an AI algorithm is critical in terms of black box understanding for a particular AI platform.

Accordingly, there is need for a system and method that improves upon the ability for detecting and tracking source code changes in AI black box applications.

SUMMARY OF THE INVENTION

The present invention is directed to a system and method for detecting and tracking source code changes in AI black box applications.

In a first implementation of the invention, a method is provided for detecting and tracking source code changes in an AI black box using a blockchain distributed ledger technology (DLT). Each block of the blockchain DLT incorporates a plug-in that is triggered when a source code change is made within an AI black box during program execution across an AI platform. Each time the plug-in is triggered indicating source changes are being made by the AI platform's black box a detection and tracking of such changes is recorded in the blockchain DLT as a new block. The specific source code changes are copied and written directly into the new block created and inserted into the blockchain DLT. At the same time, the number of source code lines modified (i.e., added, deleted and/or reorganized) are determined (i.e., counted) and relevant information identified specific to the modified source code. For example, where did the change occur in the data set, how did the modification occur (i.e., addition, deletion and/or reorganize), what changes occurred, and the results caused by the changes.

In a second aspect, an artificial intelligence black box data source code detection and tracking system is provided for detecting and tracking source code changes in an AI black box using a blockchain DLT. Each block of the blockchain DLT incorporates a plug-in that is triggered when a source code change is made within an AI black box during program execution across an AI platform. Each time the plug-in is triggered indicating source changes are being made by the AI platform's black box a detection and tracking of such changes is recorded in the blockchain DLT as a new block. The specific source code changes are copied and written directly into the new block created and inserted into the blockchain DLT. At the same time, the number of source code lines modified (i.e., added, deleted and/or reorganized) are determined (i.e., counted) and relevant information identified specific to the modified source code. For example, where did the change occur in the data set, how did the modification occur (i.e., addition, deletion and/or reorganize), what changes occurred, and the results caused by the changes.

In a third aspect, an artificial intelligence black box data source code detection and tracking application (alternatively referred to herein as an "app") is provided for executing the aforementioned method on a user device, the artificial intelligence black box data source code detection and tracking system, or other hardware.

In a further aspect, the distributed ledger technology (DLT) is a blockchain.

In a further aspect, a storyboard is created as part of the tracking and detection operations comprising a summary of the changes to the source code.

In a further aspect, the tracking and detection operations are executed by a plug-in inside each block of the plurality of blocks of the distributed ledger technology.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a system and method for detecting and tracking source code changes in an AI black box using a blockchain DLT. Importantly, each block of the blockchain DLT incorporates a plug-in that is triggered when a source code change (e.g., Java, Python, C++, etc.) is made within an AI black box during program execution across an AI platform. Illustratively, the plug-in executes akin to a smart contract as supported by the blockchain DLT. Each time the plug-in is triggered indicating source changes are being made by the AI platform's black box a detection and tracking of such changes is recorded in the blockchain DLT as a new block. The specific source code changes are copied and written directly into the new block created and inserted into the blockchain DLT. At the same time, the number of source code lines modified (i.e., added, deleted and/or reorganized) are determined (i.e., counted) and relevant information identified specific to the modified source code. For example, where did the change occur in the data set, how did the modification occur (i.e., addition, deletion and/or reorganize), what changes occurred, and the results caused by the changes. This information, organized illustratively as a storyboard, will provide a description of what is occurring within the AI black box and facilitate the ongoing security of the changes. Further, the storyboard functionality will assist in AI software development given the detailing of the black box changes made by the AI platform that can be studied and evaluated. Importantly, the principles of the disclosed embodiments provide an advantageous improvement of at least one practical application, i.e., the development, understanding, management and execution of AI platforms and their associated black box data. For example, the invention herein solves an AI software development problem given that the invention may be used to understand why and how the AI platform generated a particular answer/output/outcome, what source code modifications were made, and the conditions associated therewith. This increases software development processes, increases AI platform execution efficiency, and decreases software development costs. Thus, the problem solved by the disclosed embodiments is the AI black box of data of hidden features and not knowing what is happening and not being able to keep tracking items in an organized manner. By employing the blockchain DLT technology and plug-in inside each block there is a facilitation of better understanding AI for creating or for breaking the AI down to individual components. In an embodiment, this is realized in a blockchain software-as-a-service for AI products/platforms.

To provide further context for the subject disclosure, a high-level discussion of DLT and blockchain will now be discussed. Blockchain is a distributed database that records all transactions that have ever occurred in a network, for example. Blockchain was originally introduced for Bitcoin (a peer-to-peer digital payment system), but then evolved to be used for developing a wide range of decentralized applications. A blockchain is a distributed digital ledger which is communicated electronically between hardware devices. Each transaction recorded within the digital ledger is a block which can be hashed or otherwise encrypted. As new transactions are added to the digital ledger, each transaction's veracity can be tested against the previous ledger stored by the devices. In some configurations, there may be a requirement that some fixed percentage (e.g., 50%) of the user devices must confirm the transaction's veracity before being added to the blockchain. As such, a blockchain is a distributed database that records all transactions that have ever occurred in the blockchain network. This database is replicated and shared among the network's participants (or a subset thereof in some implementations). The main feature of blockchain is that it allows untrusted participants to communicate and send transactions between each other in a secure way without the need of a trusted third party. In this way, blockchain is an ordered list of blocks, where each block is identified by its cryptographic hash. Each block references the block that came before it, resulting in a chain of blocks. Each block consists of a set of transactions. Once a block is created and appended to the blockchain, the transactions in that block cannot be changed or reverted. This is to ensure the integrity of the transactions, for example, the AI platform applications in accordance with the principles of the embodiments herein.

In essence, as noted previously, a blockchain is a transaction ledger that maintains identical copies across each computer of a member network and the fact that the ledger is distributed across part of the network facilitates the security of blockchain. A blockchain relies on three important components: private key technology, a distributed network that includes a shared ledger, and an accounting means for the transactions and records across the network. A blockchain is a list of records that are cryptographically linked together such that each block of the blockchain contains a cryptographic hash of the previous block, a timestamp, and transaction data. Thus, a blockchain is highly resistant to date modification due to the design feature that once recorded the data in any given block cannot be altered without alteration of all subsequent blocks. In many applications, the constructed distributed ledger is managed within a peer-to-peer network that allows participants to verify and audit transactions in an efficient manner. By combining the use of cryptographic keys with a distributed network, blockchain expands the type and number of digital transaction possibilities.

An appealing application that can be deployed on top of blockchain are so-called smart contracts. A smart contract is executable code that runs on the blockchain to facilitate, execute, and enforce the terms of an agreement between parties. It can be thought of as a system that releases digital assets to all or some of the involved parties once the pre-defined rules have been met. The main aim of a smart contract is to automatically execute the terms of an agreement once the specified conditions are met. In this way, a smart contract functions as a trusted distributed application that gains its security/trust from the blockchain and the underlying consensus among the peers. In essence, serving as a form of execution logic of a blockchain application (e.g., the AI platform processing hereunder). Thus, smart contracts promise low transaction fees compared to traditional systems that require a trusted third party to enforce and execute the terms of an agreement. There are different blockchain platforms that can be utilized to develop smart contracts, and Ethereum is a common platform for developing smart contracts. Ethereum is a public blockchain platform that can support advanced and customized smart contracts with the help of Turing-complete programming language. The code of Ethereum smart contracts is written in a stack-based bytecode language and executed in an Ethereum Virtual Machine (EVM). Several high-level languages (e.g., Solidity and Serpent) can be used to write Ethereum smart contracts. The code of those languages can then be compiled into EVM bytecodes to be run.

Another blockchain platform that is increasingly gaining traction is the Hyperledger Fabric (also referred to as "Fabric") as established by the Linux Foundation (see, e.g., LFS272: Hyperledger Fabric Administration, version 8.24, dated May 26, 2021) with a major focus on enterprise uses that require participants to be identified/identifiable, permissioned networks, high transaction throughput performance, low latency of transaction confirmation and privacy and confidentiality of transactions and data pertaining to business transactions. Fabric is the first distributed ledger platform to support smart contracts authored in general-purpose programming languages such as Java, rather than domain-specific languages (DSL). As such, enterprises can more easily develop smart contracts without the need to learn a specific/new programming language. The Fabric platform is also permissioned in that, unlike a public permissionless network, the participants are known to each other, rather than anonymous and therefore fully untrusted. This means that while the participants may not fully trust one another (e.g., if they are adverse parties or competitors) a network can be operated under a governance model that is constructed as a function of whatever trust does exist between participants, such as a legal framework. These features make Fabric one of the better performing platforms that are currently available both in terms of transaction processing and transaction confirmation latency. Further, this platform enables privacy and confidentiality of transactions and smart contracts that implement them.

Fabric has been specifically designed with a modular architecture making it very adaptable and customizable for various use cases. The modular components include (i) a pluggable ordering service that established consensus on the order of transactions and then broadcasts blocks to peers; (ii) a pluggable membership service provider that is responsible for associating entities in a network with cryptographic identities; (iii) smart contracts (so-called chain code) run within a contained environment for isolation and can be written in standard programming languages; (iv) the ledger can be configured to support a variety of database management systems (DBMS); and (v) a pluggable endorsement and validation policy enforcement can be independently configured per application. As noted above, in accordance with the principles of the disclosed embodiments, a blockchain DLT is employed for the detecting and tracking of source code changes made within the AI black box, and each block of the blockchain DLT incorporates a plug-in that is triggered when a source code change is made within the AI black box during program execution across an AI platform. Illustratively, the plug-in executes akin to a smart contract as supported by the blockchain DLT. Each time the plug-in is triggered indicating source changes are being made by the AI platform's black box, a detection and tracking of such changes is recorded in the blockchain DLT as a new block. To be clear, while any DLT technology platform may be used in conjunction with the principles of the embodiment herein, Fabric is particularly well-suited for the implementations detailed herein.

Figure 1:
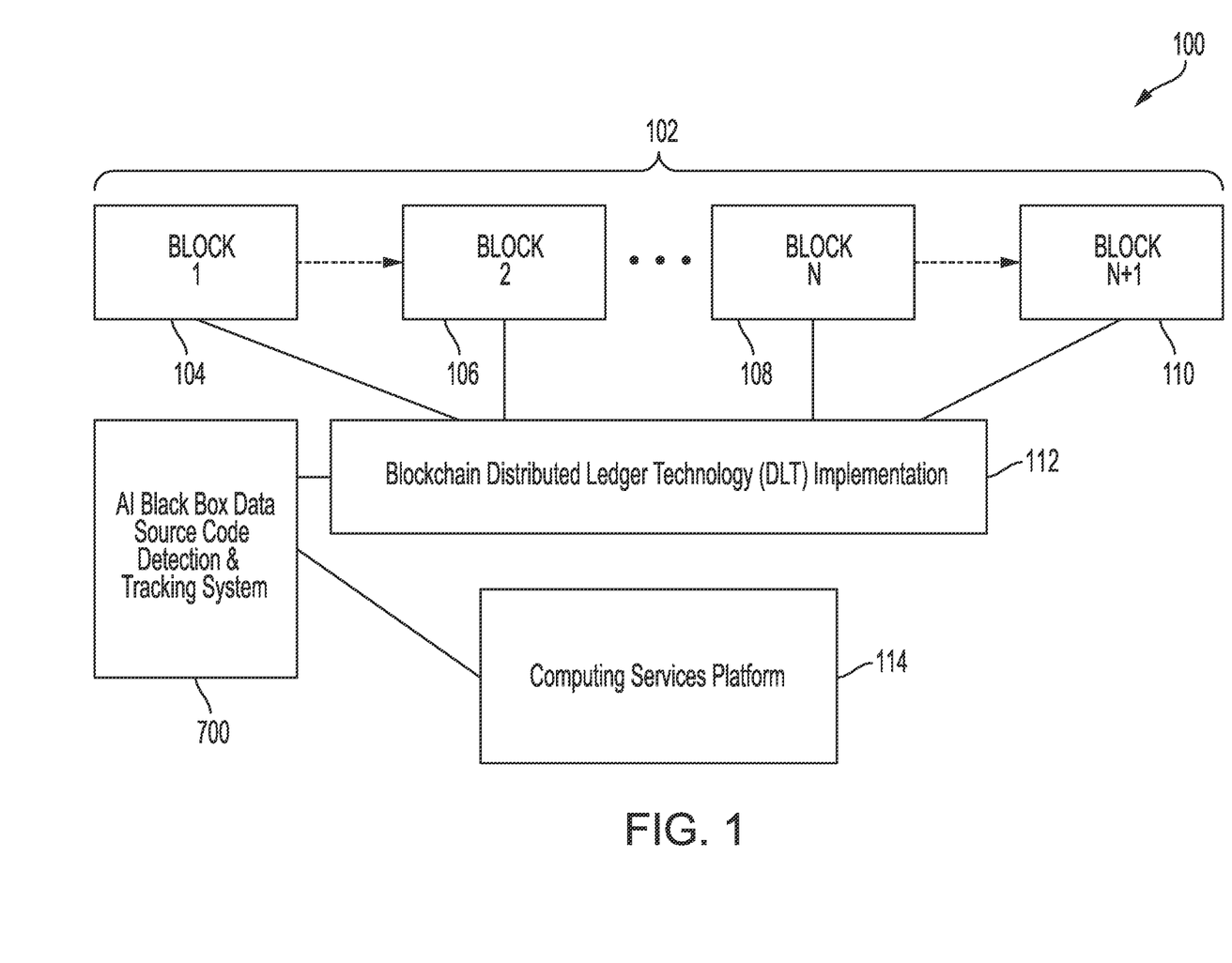
FIG. 1 presents a high-level block system architecture for artificial intelligence black box data source code detection and tracking system in accordance with an embodiment.

Turning our attention to FIG. 1, a high-level block system architecture 100 is presented for providing artificial intelligence black box data source code detection and tracking system. As shown, AI black box data source code and tracking system 700 (see, FIG. 7), as will be further detailed herein below, is interfaced with a computing services platform 114 that hosts various systems. In accordance with the embodiment, the computing services platform 114 provides necessary processing and storage functionality for blockchain DLT implementation 112. As noted above, in a preferred embodiment, the blockchain DLT implementation 112 is the Hyperledger Fabric made available by the Hyperledger Project. The computing services platform 114 can include a platform such as Amazon Web Services, Microsoft Azure, and Google Cloud computer or any private cloud or non-cloud-based computing platform that parties have access to. A suitable communications network can connect hardware devices on blockchain 102 comprised of a plurality of blocks (e.g., block 1 104, block 2, 106, block N 108 and block N+1 110). The details of the blockchain 102 and its import to and with the principles of the disclosed embodiments are discussed in greater detail herein below.

Figure 2:
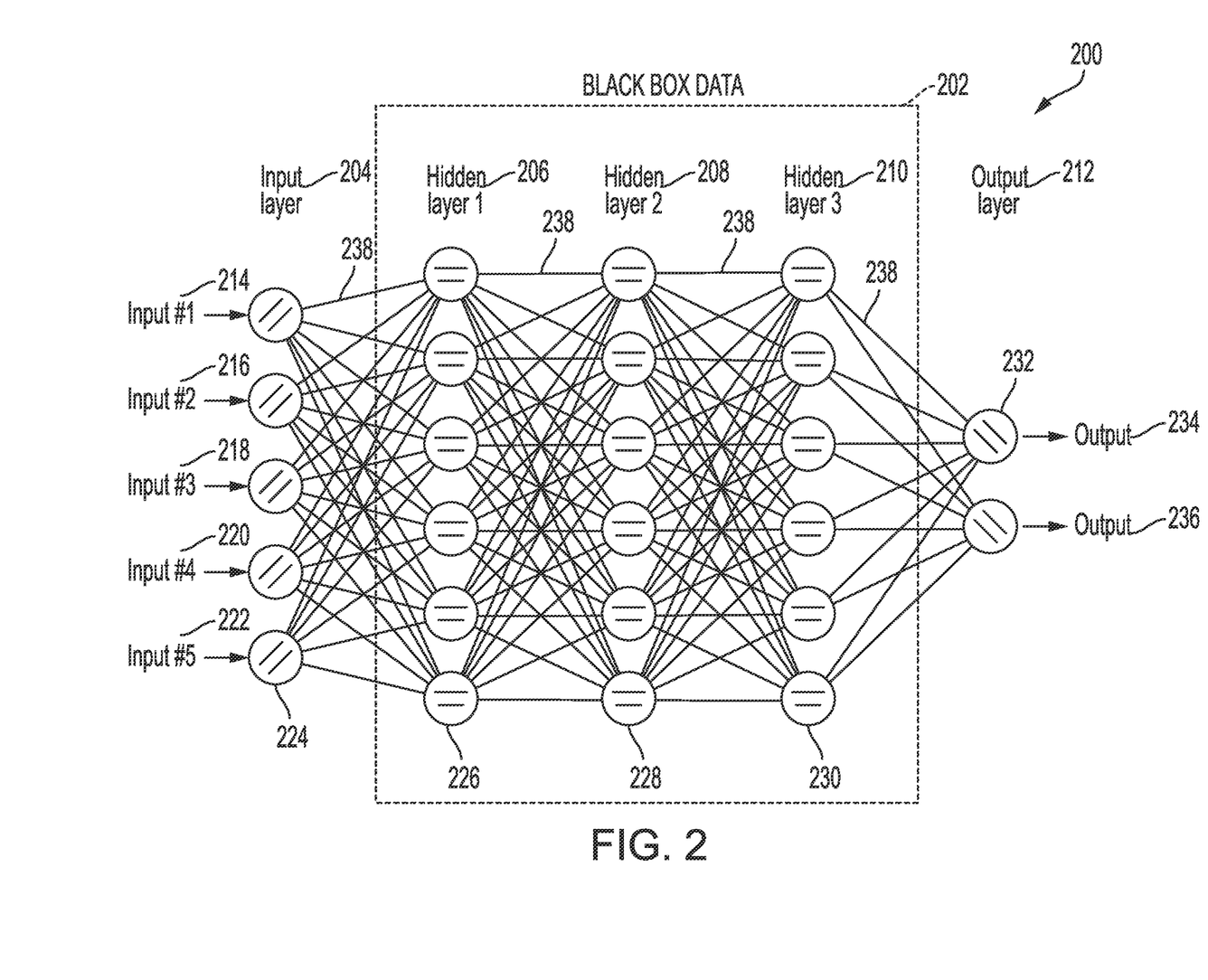
FIG. 2 presents an illustrative artificial intelligence platform in accordance with an embodiment.

Turning our attention to FIG. 2, an illustrative artificial intelligence platform 200 is shown for context in accordance with an embodiment. The AI platform 200 is illustrative of a typical AI platform having input layer 204 comprising one or more inputs (e.g., input #1 214, input #2 216, input #3 218, input #4 220, and input #5 222) feeding respective neurons 224. As will be appreciated, an AI neuron is a mathematical function conceived as a model of biological neurons, a neural network. The input received by the neurons 224 will be summed up to produce on output or activation, representing a neuron's action potential which is transmitted along its axon. Typically, each input is separately weighted, a sum is passed through a non-linear function known as an activation function or transfer function. Such transfer functions typically have a sigmoid shape. Connections 238 connect each neuron with each other neuron. As shown, black box data 202 comprises multiple hidden layers, namely, hidden layer 1 206 comprising neurons 226, hidden layer 2 208 comprising neurons 228, and hidden layer 3 210 comprising neurons 230. The hidden layers in turn feed output layer 212 comprising neurons 232 that provide outputs of the AI platform 202, namely, output 234 and output 236.

Figure 3:
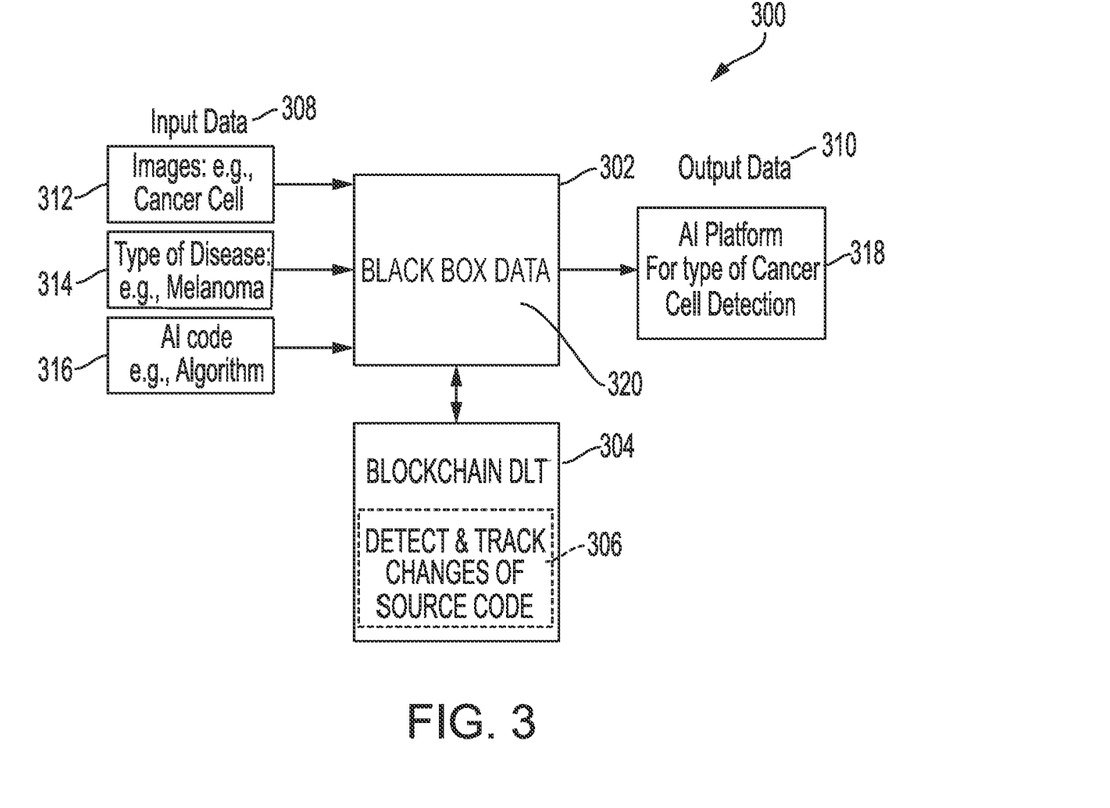
FIG. 3 presents an illustrative source code detection and tracking plug-in within a blockchain DLT for output data from an artificial intelligence black box in accordance with an embodiment.

Turning our attention to FIG. 3, an illustrative source code detection and tracking plug-in within a blockchain DLT for output data from artificial intelligence black box data example 300 is shown in accordance with an embodiment. As shown in illustrative example 300, AI black box 302 comprising black box data 320 has input data 308 comprising input 312, input 314 and input 316, respectively. In the illustrative example of FIG. 3, if a user does not have any idea about the desired AI output, then the user may dissect it by running it through the black box, in accordance with the principles of the disclosed embodiments hereunder, to determine what the independent variables will be and how the AI/machine learning algorithm chooses a path(s) to create the AI platform/software/code. As such, in accordance with the principles of the disclosed embodiments, a user may create their own AI algorithm or AI platform/software (see, FIG. 5; and as later discussed herein) and/or identify what the AI algorithm is actually doing based on given results, as shown in FIG. 3. As can be seen the illustrative example 300 is directed to a healthcare AI application and in particular cancer diagnosis and detection. Input 312 comprises a number of cancer cell images, the input 314 comprises a disease type (e.g., melanoma), and the input 316 comprises a particular AI code (e.g., an AI algorithm) directed to the cancer diagnosis and detection problem. The inputs are fed into the black box 302 where, in accordance with the principles of the disclosed embodiments, blockchain DLT 304 comprising plug-in 306 therein will be triggered when there is a detection of one or more source code changes within the AI black box 302 as the AI code 316, for example, is executed, as will be further detailed herein below. Ultimately, the AI black box 302 provides output 318 as output data 310 indicative of the cancer type detected as a function of the input data 308.

Figure 4:
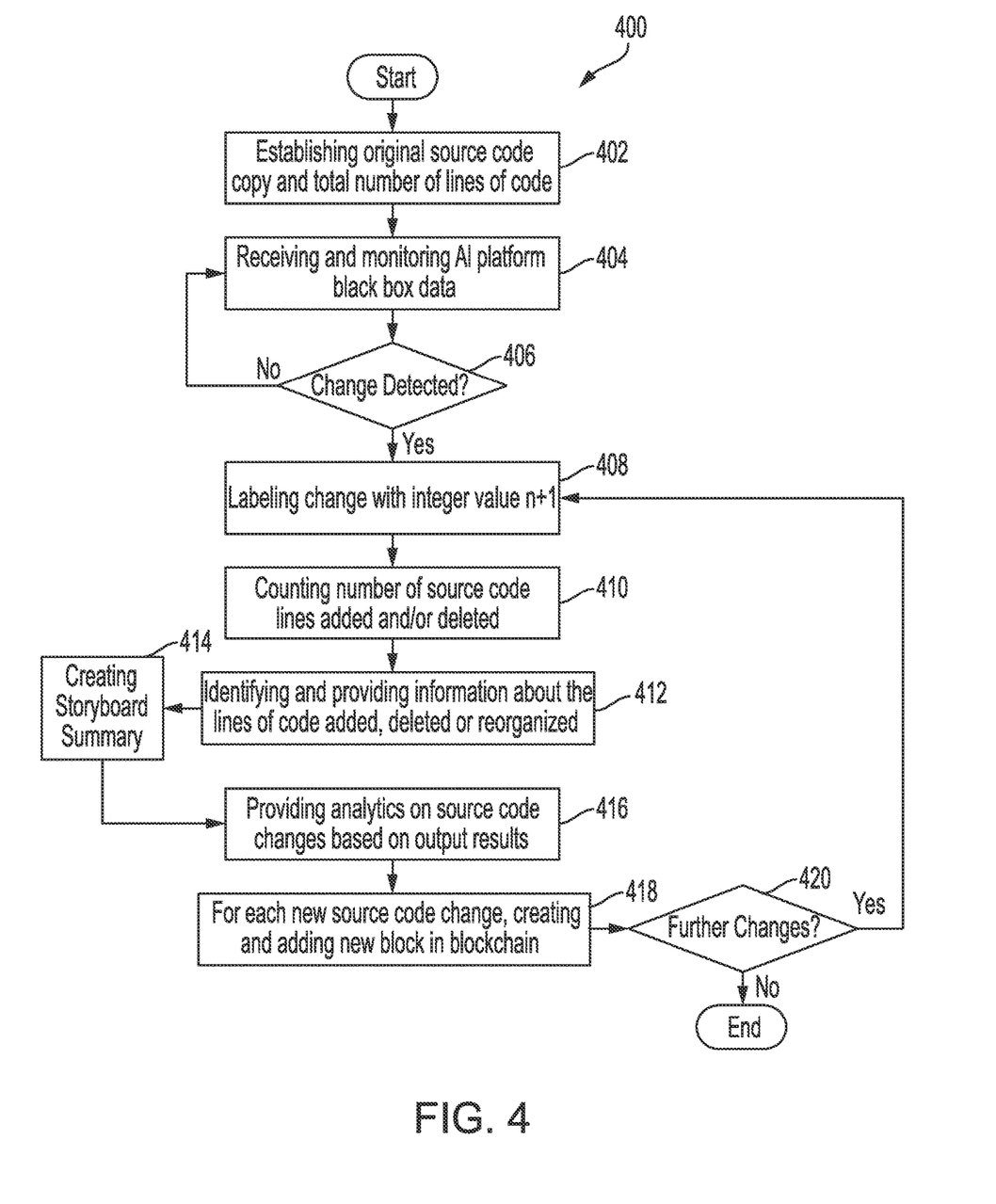
FIG. 4 presents a flowchart of illustrative operations for detecting and tracking source code changes in an artificial intelligence black box application in accordance with an embodiment.

Turning our attention to FIG. 4, a flowchart of illustrative operations 400 is shown for detecting and tracking source code changes in an artificial intelligence black box application in accordance with an embodiment. Illustratively, the operations are executed by and through a plug-in inside each block of the plurality of blocks (e.g., the plug-in 306). At step 402, establishing an original source code copy of a program (e.g., and AI algorithm (and the number source code lines therein (e.g., by counting the lines of source code). At step 404, receiving and monitoring the AI platform through the AI black box and black box data associated therewith (e.g., the black box 302 and the black box data 320), and at step 406, determining whether any change or modification to any source code has occurred. If not, then the monitoring by the plug-in continues at step 404. If a change is detected thereby triggering the plug-in resident in an associated block of the blockchain, then at step 408, labeling the change with an integer value (e.g., "1") in order to identify and refer to the detected change with specificity. At step 410, the number of source code lines added and/or deleted are counted. This will allow for a tracking and comparison against the original number of source code lines as determined, in step 402, for the original source code copy. Further, at step 412, identifying and providing information about the lines of code added, deleted, or reorganized. For example, the number of source code lines modified, where did the change occur in the data set, how did the modification occur (i.e., addition, deletion and/or reorganize), what changes occurred, and the results caused by the changes. This information, at step 414, is organized by creating a storyboard that will provide a description of what is occurring within the AI black box and facilitate the ongoing security of the changes. Further, the storyboard functionality will assist in AI software development given the detailing of the of the black box changes, by the triggered plug-in, made by the AI platform. At step 416, providing the analytics on the source code changes including, but not limited to, the storyboard created based on the black box output data results. Then, at step 418, for each new source code detected, creating a new block, and adding the newly created block to the blockchain. At step 420, determining whether the plug-in has detected any further changes. If so, then the operations return to step 408. If not, the operations cease.

Figure 5:
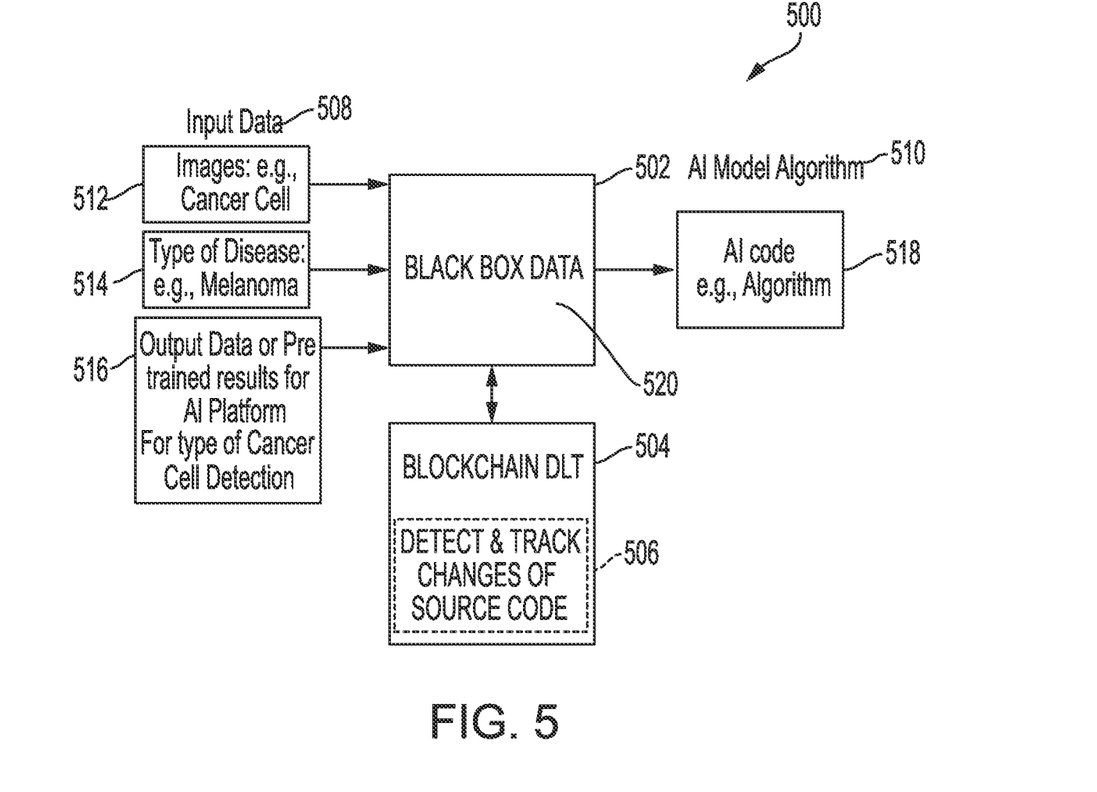
FIG. 5 presents an illustrative source code detection and tracking plug-in within a blockchain DLT for an AI model algorithm from an artificial intelligence black box in accordance with an embodiment.

Turning our attention to FIG. 5, an illustrative source code detection and tracking plug-in within a blockchain DLT for an AI model algorithm from an artificial intelligence black box example 500 is shown in accordance with an embodiment is shown. In the illustrative example 500 of FIG. 5, the user wants to create AI code as a function of a desired output (e.g., a representation of what a cancer cell is on the input side of the black box and then training the neural network to get the AI—through the black box—to create features that would be used to detect the desired output based on that input representation) and thereby creating an individualized AI/ML algorithm therefore. As shown in FIG. 5, AI black box 502 comprising black box data 520 has input data 508 comprising input 512, input 514 and input 516, respectively. As can be seen the illustrative example 500, AI model algorithm 510 is directed to a healthcare AI application and in particular cancer diagnosis and detection. Input 512 comprises a number of cancer cell images, the input 514 comprises a disease type (e.g., melanoma), and the input 516 comprises certain output data or pre-trained results from the AI platform directed to the cancer diagnosis and detection problem. The inputs are fed into the black box 502 where, in accordance with the principles of the disclosed embodiments, blockchain DLT 504 comprising plug-in 506 inside that will be triggered when there is a detection of one or more source code changes within the AI black box 502 as the AI model algorithm 510, for example, is executed. Ultimately, the AI black box 502 provides output 518 indicative of the AI code generated by the AI model algorithm 510 for use by the AI platform in addressing the cancer diagnosis and detection problem as originally posed.

Figure 6:
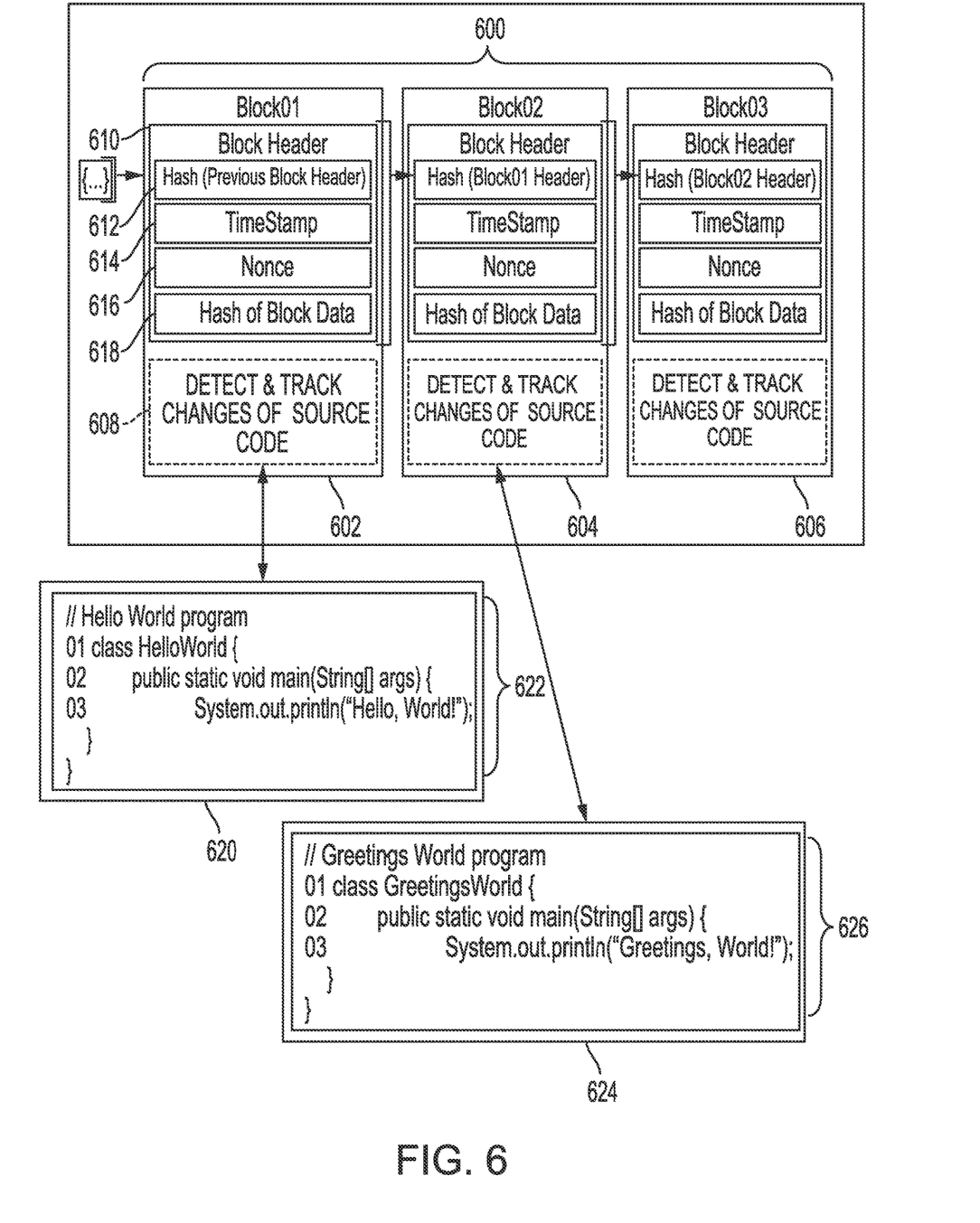
FIG. 6 presents an illustrative blockchain DLT generated from a source code detection and tracking plug-in within the blockchain DLT associated with an artificial intelligence black box in accordance with an embodiment.

For example, FIG. 6 presents an illustrative blockchain DLT 600 generated from a source code detection and tracking plug-in within the blockchain DLT 600 associated with an artificial intelligence black box in accordance with an embodiment. As shown, blockchain DLT 600 comprises blocks 602, 604, and 606 with each block comprising a respective block header 610, hash (previous block header) 612, timestamp 614, nonce 616, hash of block data 618 and plug-in 608 configured in accordance with disclosed embodiment herein. In the instant example, two (2) source code modifications (i.e., modification 620 and modification 624) have been detected and identified by the respective plug-in 608 of block 602 and the respective plug-in 608 of block 604, respectively. Illustratively, the modification 620 detected comprises source code lines 622, and the modification 624 comprises source code lines 626 as detected and identified by the respective plug-in 608. In accordance with the embodiment, a new block for insertion into the blockchain DLT 600 will be created comprising the source code lines 622 and the source code lines 626, respectively. Each block will have separate integer label (e.g., N and N+1) and a separate storyboard (not shown) will be created for each respective modification that may include the number of source code lined modified, where did the change occur in the data set, how did the modification occur (i.e., addition, deletion and/or reorganize), what changes occurred, and/or the results caused by the changes. In this way, a complete history of detected source code modifications occurring within the AI platform and/or the black boxes of data.

In accordance with the principles of the disclosed embodiments, there is the ability to keep track of how the data is being used by the AI neural network or a multi-perceptron algorithm thereby acting as a ledger keeping track of the changes of the AI/machine learning using the blockchain DLT/smart contracts. The smart contract defines the different states of an object and governs the processes that move the object between these different states, in this case, the AI platform. Smart contracts are important because they allow architects and smart contract developers to define the key processes and data that are shared across the different organizations collaborating in the blockchain network.

For example, in computer vision AI used to detect cancer in tissue there exists a potential problem that fake images may be added to the AI algorithm (the so-called "deepfake" problem"), if the database is hacked by a third party. However, in accordance with the disclosed embodiments herein, by using blockchain to store the image sets of data (e.g., MRI's, X-rays, etc.) there cannot be any duplication of the original image. That is, any original image will have a timestamp, and other factors verifying that image's originality. This facilitates leveraging the blockchain acting as a ledger for keeping track of the changes of AI/machine learning using the blockchain DLT/smart contracts and increasing overall security. For example, in the case of using AI software for deep learning in MRI imaging in a clinical setting. In this use case, there will be the creation of a high volume computer vision images data set that may be analyzed, for example, using a convolution neural networks (CNN) model. The storage of the images data set will show the CNN what an MRI image is and is not in order to train the neural network. As noted, one potential issue is if the database is hacked, and the hackers upload fake images of MRI images in the data set thereby causing problems for the AI software. A way to counter this hacking problem, would be to develop an algorithm of AI methodology to detect image pixels that have been distorted (such as compressed, saved over, and/or edited pixels) and create a standardized set of specifications/qualifications to identify which is an MRI image pixel or which is not. In accordance with a further embodiment herein, the data storage may be used to store the images securely in blockchain DLT and use the developed AI algorithm to determine if the MRI pixels changed or remained the same as originals uploaded in ledger. Illustratively, this may be accomplished by examining the history to compare the pixel data and any "deep-fakes" in the AI problem. This is facilitated by storing the deepfakes in the blockchain DLT and triggering the plug-in, in accordance with the principles of the disclosed embodiments, to detect and track any changes in the pixel data and recording the same in the blockchain thereby creating a history that is well organized for examination purposes. Thus, the principles of the disclosed embodiments extend to a variety of detecting and monitoring applications (e.g., source code, date, images, etc.) including but not limited to source code modifications as detailed herein.

Figure 7:
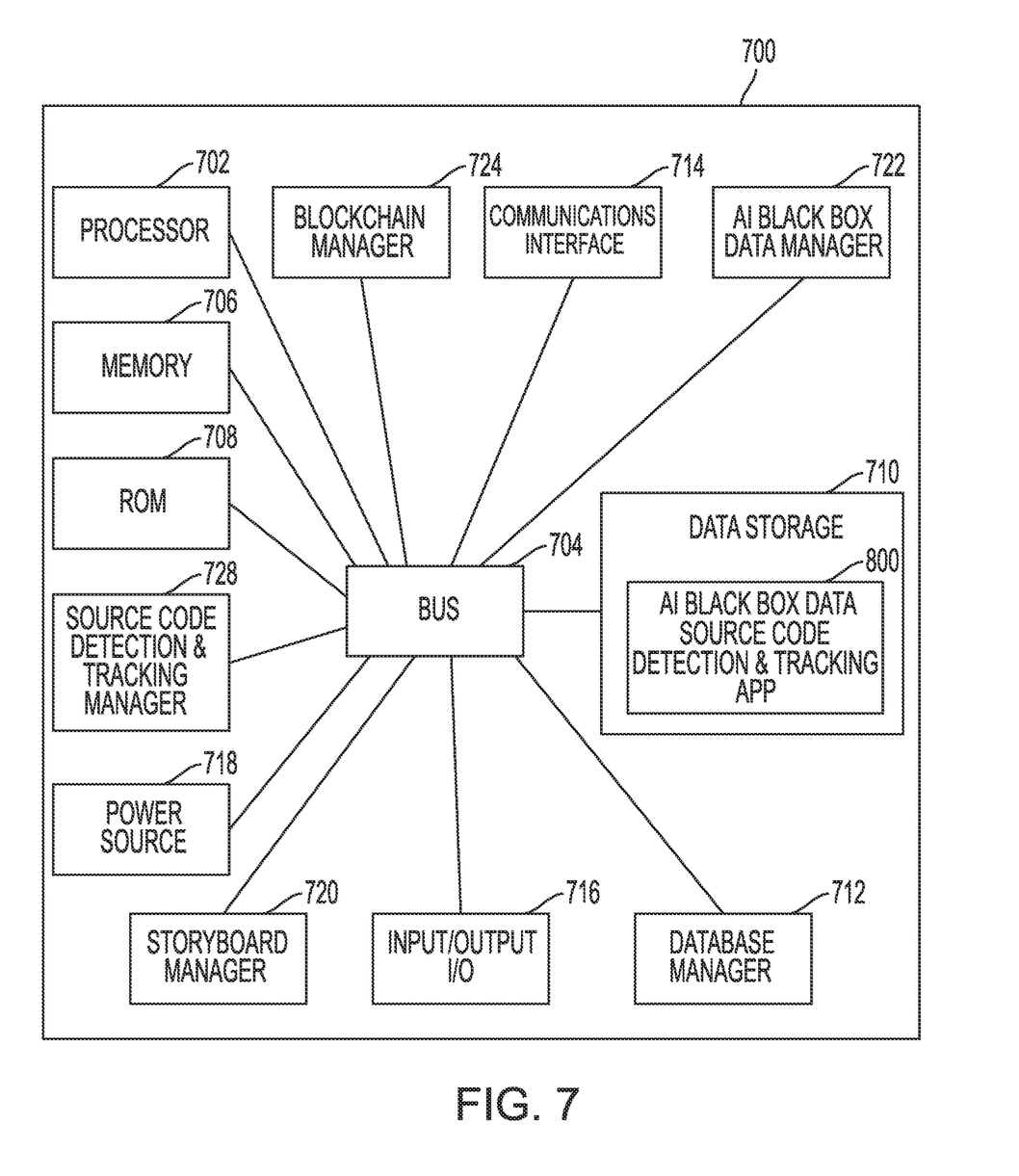
FIG. 7 presents an illustrative artificial intelligence black box data source code detection and tracking system in accordance with an embodiment.
Figure 8:
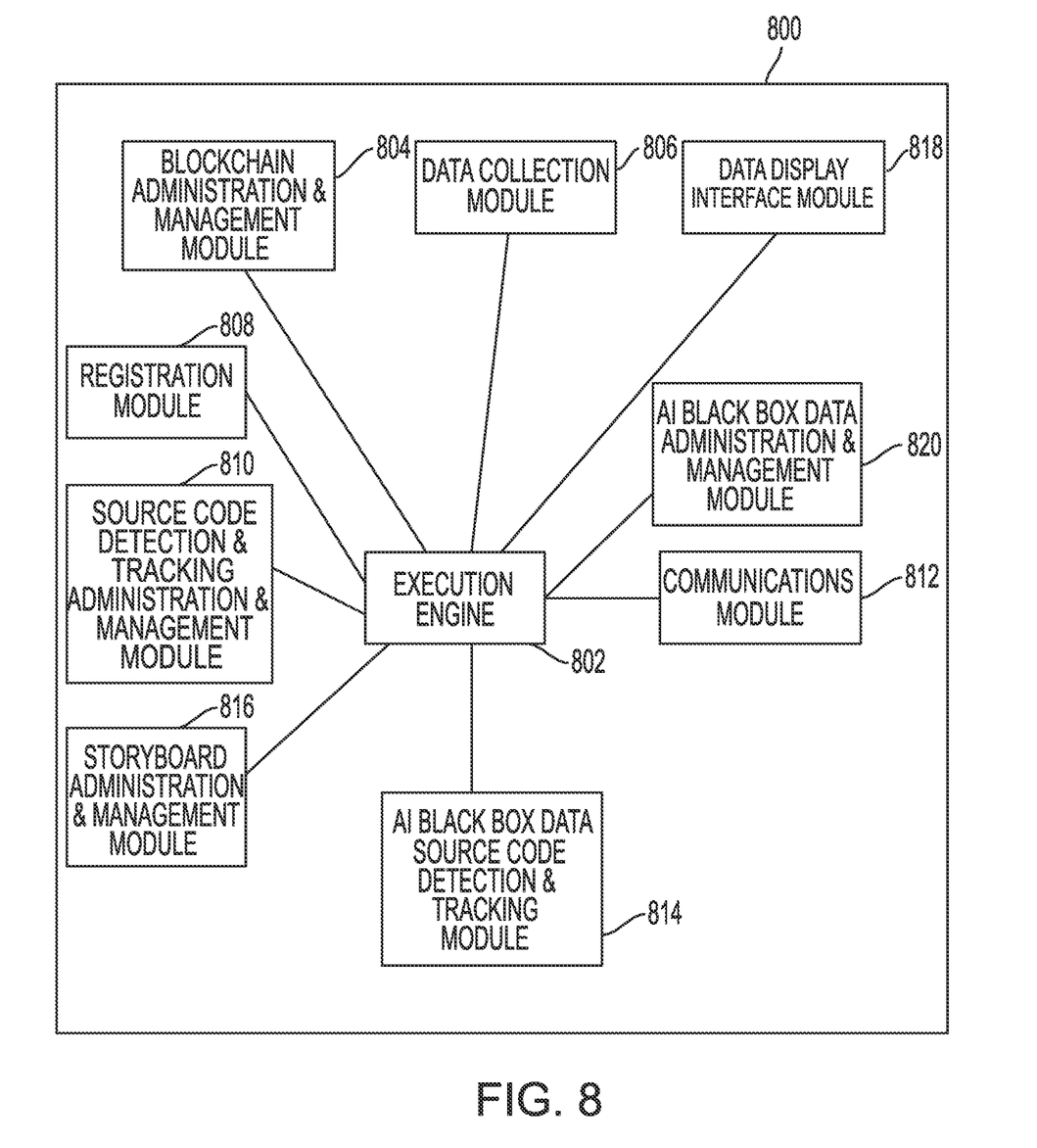
FIG. 8 presents an illustrative architecture for an artificial intelligence black box data source code detection and tracking app in accordance with an embodiment.

Turning our attention to FIG. 7, an illustrative configuration for the artificial intelligence black box data source code detection and tracking system 700 is shown in accordance with an embodiment. As shown, the artificial intelligence black box data source code detection and tracking system 700 comprises processor 702 for executing program code (e.g., AI black box data source code detection and tracking app 800) and communications interface 714 for managing communications to and from the artificial intelligence black box data source code detection and tracking system 700, memory 706 and/or ROM 708 for storing program code and data, and power source 718 for powering the artificial intelligence black box data source code detection and tracking system 700. The memory 706 is coupled to the bus 704 for storing computer-readable instructions to be executed by the processor 702 (e.g., execution of the AI black box data source code detection and tracking app 800). The processor 702, as powered by power source 718, may include both general and special purpose microprocessors, and may be the sole processor or one of multiple processors of any hardware device. Further, the processor 702 may comprise one or more central processing units (CPUs) and may include, be supplemented by, or incorporated in, one or more application-specific integrated circuits (ASICs) and/or one or more field programmable gate arrays (FPGAs).

In a preferred embodiment, processor 702 is a tensor processing unit (TPU) which is an AI accelerator ASIC developed by Google specifically for neural network machine learning and particularly using Google's own TensorFlow software. In 2018, such TPU's were made commercially available for third party use. Tensors are multi-dimensional arrays or matrices which are fundamental units that can hold data points such as weights of a node in a neural network in a row and column format. Basic math operations are performed on tensors, including addition, element-wise multiplication, and matrix multiplication. FLOPs (floating point operations per second) are units of measure of performance of a computational operation. The custom floating-point format, in the case of TPUs, is so-called "brain floating point format," or "bfloat16" for short that is placed within systolic arrays to accelerate neural network training. The higher the range of FLOPs, the higher is the processing power. A systolic array is a network of processors that are responsible for performing computations and passing the results across the system and consists of a large number of processing elements that are arranged in arrays. These arrays have a high degree of parallelism and are particularly useful for parallel computing. A TPU can handle massive multiplications and additions for neural networks, at great speeds while reducing the use of power. Typically, TPUs execute three (3) main steps: (i) initially, the parameters are loaded from memory into the matrix of multipliers and adders; (ii) then, data is loaded from memory; and (iii) after every multiplication operation, the results are passed on to next multipliers while taking summation (i.e., dot product) at the same time. The output is then given as the summation of all multiplication results between data and parameters. A TPU allows the chip to be more tolerant to reduced computational precision, which means it requires fewer transistors per operation, and therefore a single chip can handle relatively more operations per second.

The memory 706 may also be utilized for storing temporary variables or other intermediate information during the execution of the instructions by the processor 702. Data storage device 710, such as a magnetic, optical, or solid-state device may be coupled to the bus 704 for storing information and instructions for the processor 702 including, but not limited to, the AI black box data source code detection and tracking app 800. Data storage device 710 and the memory 706 may each comprise a tangible non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices. Data storage device 710 and/or the memory 706 may also constitute and/or interface with any variety of so-called hardware wallet or software wallet that may be deployed in the context of the blockchain DLT for storing digital information such as a user's private keys (e.g., cryptographic private keys).

Database manager 712 is used to manage the delivery and storage of content, data, and other information in any type of database employed with the artificial intelligence black box data source code detection and tracking system 700. Source code detection and tracking manager 728 and AI black box data manager 722 facilitate the detection, tracking, monitoring, identification, and processing of the detected source code modifications (e.g., additions and/or deletions of source code) within the AI black box (e.g., the black box 302 or the black box 502) by the respective plug-in inside the block of the blockchain DLT ledger, as detailed previously. The creation and management of blocks, in accordance with the principles of the disclosed embodiments, within the blockchain DLT is facilitated by blockchain manager 724. Storyboard manager 720 facilitates the creation and management of individual storyboards for the detected source code modifications made in accordance with the principles of the embodiments, as detailed herein above.

The communications interface 714 is used to facilitate communications across communications links within a network (e.g., a cloud-based network). This may take the form, for example, of a wide area network connection that communicatively couples the artificial intelligence black box data source code detection and tracking system 700 with access points which may be a cellular communications service. Similarly, communications managed by the communications interface 714 may take the form, for example, of a local Wi-Fi network interface or Ethernet interface the communicatively couples the artificial intelligence black box data source code detection and tracking system 700 with the well-known Internet and a wide variety of hardware devices (e.g., mobile devices, computers, tablets, and smartphones, to name just a few). The input/output devices 716 may include peripherals, such as a camera, printer, scanner, display screen, etc. For example, the input/output devices 716 may include a display device such as a cathode ray tube (CRT), plasma monitor, liquid crystal display (LCD) monitor or organic light-emitting diode (OLED) monitor for displaying information to a user device, a keyboard, and a pointing device such as a mouse or a trackball by which the user can provide input to the user device or an associated display device, for example.

Turning our attention to FIG. 8, an illustrative architecture for the operation of the AI black box data source code detection and tracking app 800 is presented in accordance with an embodiment. As will be appreciated, the architecture may be used in conjunction with the AI black box data source code detection and tracking system 700 and its associated operations. The software application may be written in a programming language such as, but not limited to, Java, C++ and the like and compatible with Linux, Windows, Android, and Apple operating system platforms. As shown, the architecture for the operations of the AI black box data source code detection and tracking app 800 provides several interfaces and engines used to perform a variety of functions such as the collection, aggregation, manipulation, processing, analyzing, verification, authentication, and display of applicable real-time information and data that are useful to achieve the AI platform and black box processing of the disclosed embodiments. More particularly, data display interface module 818 and communications module 812 are used to facilitate the input/output and display of electronic data and other information to, illustratively, the software developers executing the AI black box data source code detection and tracking app 800 in the monitoring of an AI platform. The data collection interface module 806 facilitates the collection of relevant AI platform data, black box data, source code modifications, blockchain and other relevant information. The communications module 812 will facilitate communications by and through the AI black box data source code detection and tracking system 700, for example.

Execution engine 802 may be employed to deliver the AI platform processing herein through the execution of the AI black box data source code detection and tracking app 800. In such delivery, the execution engine 802 will operate and execute, as further detailed herein below, with at least the following program modules: blockchain administration & management module 804, data collection module 806, data display interface module 818, registration module 808, source code detection and tracking administration and management module 810, communications module 812, AI black box data source code detection and tracking module 814, storyboard administration and management module 816, and AI black box data administration and management module 820. The registration module 808 may be used to register individual users of the AI black box data source code detection and tracking system 700, for example. The source code detection and tracking administration and management module 810, the AI black box data source code detection and tracking module 814, the storyboard administration and management module 816, and AI black box data administration and management module 820 are used to facilitate the collection, aggregation, manipulation, processing, analyzing, verification, authentication, and display of applicable real-time information and data that are useful to achieve the AI platform and black box processing of the disclosed embodiments. In particular, the detection, tracking, monitoring, identification, and processing of the detected source code modifications (e.g., additions and/or deletions of source code) within the AI black box (e.g., the black box 302 or the black box 502) by the respective plug-in inside the block of the blockchain DLT ledger, as detailed previously. The creation and management of blocks, in accordance with the principles of the disclosed embodiments, within the blockchain DLT and the creation and management of individual storyboards for the detected source code modifications made in accordance with the principles of the embodiments, as detailed herein above.

As noted above, in some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIG. 4) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method comprising:
    receiving a copy of an original source code program, the original source code program for execution on an artificial intelligence platform the artificial intelligence platform utilizing a block chain distributed-technology in the execution of the original source code program and
    wherein each respective one block of the plurality of blocks are linked and with-in each respective one block there at least are respective one block header, hash of a previous block, timestamp, nonce, hash of block data and plug-in;
    determining a total number of lines of source code in the original source code program;
    monitoring an execution of the original source code program within a black box of the artificial intelligence platform;
    triggering an execution of the respective one plug-in within a respective one block of the plurality of blocks upon detection of at least one modification to the original source code program made during execution of the original code program within the black box of the artificial intelligence platform and identifying and tracking using the respective one plug-in triggered within the respective one block of the plurality of blocks,
    the at least one modification to the original source code program made during execution of the original code program within the black box of the artificial intelligence platform,
    the at least one modification comprising either an addition or a deletion of a specific set of source code lines to the total number of lines of source code in the original source code program determined;
    determining, based on the at least one modification identified and tracked by the respective one plug-in triggered, a total number of lines of source code in the specific set of source code lines added or deleted;
    assigning an integer label to the at least one modification detected;
    creating a new block comprising at least the specific set of source code lines of the at least one modification detected: and adding the new block created to the plurality of blocks of the distributed ledger technology;
    providing analytics on the at least one modification to the original source code program made during execution of the original code program within the black box of the artificial intelligence platform.

2. The method of claim 1, wherein the method further comprises:
    for the respective one block of the plurality of blocks having its respective one plug-in triggered, identifying descriptive information specific to the at least one modification to the original source code program made during execution of the original code program within the black box of the artificial intelligence platform which caused the triggering of the respective one plug-in of the respective one block.

3. The method of claim 2, wherein the method further comprises:
    creating at least one storyboard using the descriptive information identified.

4. The method of claim 3, wherein the at least one storyboard created comprises at least an indication of (i) where the at least one modification to the original source code program occurred in a data set, (ii) how did the least one modification to the original source code program occur, (iii) what changes occurred as a consequence of least one modification to the original source code program, and (iv) what results were caused by the least one modification to the original source code program.

5. The method of claim 1, wherein the blockchain distributed ledger technology is implemented using a Hyperledger Fabric protocol.

6. The method of claim 1 wherein the respective one plug-in within each respective one block is a smart contract executing on the blockchain distributed ledger technology.

7. The method of claim 1, wherein the AI platform is directed to a healthcare application.

8. The method of claim 1, wherein the blockchain distributed ledger technology may be either a centralized blockchain distributed ledger technology or a de-centralized blockchain distributed ledger technology.

9. A method comprising:
    receiving a copy of an original source code program, the original source code program for execution on an artificial intelligence platform, the artificial intelligence platform utilizing a blockchain distributed ledger technology comprising a plurality of blocks in the execution of the original source code program and
    wherein each respective one block of the plurality of blocks are linked cryptography and within each respective one block there is at least a respective one: block header, bash of a previous block timestamp, nonce, hash of block data and plug-in,
    determining a total number of lines of source code in the original source code program:
    monitoring an execution of the original source code program within a black box of the artificial intelligence platform, triggering an execution of the respective one plug-in within a respective one block of the plurality of blocks upon detection of at least one modification to the original source code program made during execution of the original code program within the black box of the artificial intelligence platform and identifying and tracking, using the respective one plug-in triggered within each the respective one block of the plurality of blocks, the at least one modification to the original source code program made during execution of the original code program within the black box of the artificial intelligence platform, the at least one modification comprising either an addition or a deletion of a specific set of source code lines to the total number of lines of source code in the original source code program determined, and wherein the respective one plug-in is a smart contract executing on the blockchain distributed ledger technology;

determining, based on the at least one modification detected, a total number of lines of source code in the specific set of source code lines added or deleted;

for the respective one block of the plurality of blocks having its respective one plug-in triggered, identifying descriptive information specific to the at least one modification to the original source code program made during execution of the original code program within the black box of the artificial intelligence platform, which caused the triggering of the respective one plug-in of the respective one block:

assigning an integer label to the at least one modification detected;

creating a new block comprising at least the specific set of source code lines of the at least one modification detected: and adding the new block created to the plurality of blocks of the distributed ledger technology;

providing analytics on the at least one modification to the original source code program made during execution of the original code program within the black box of the artificial intelligence platform.

10. The method of claim 9, wherein the method further comprises:

creating at least one storyboard using the descriptive information identified.

11. The method of claim 10, wherein the at least one storyboard created comprises at least an indication of (i) where the at least one modification to the original source code program occurred in a data set, (ii) how did the least one modification to the original source code program occur, (iii) what changes occurred as a consequence of least one modification to the original source code program, and (iv) what results were caused by the least one modification to the original source code program.

12. The method of claim 9 wherein the at least one modification comprises a reorganization of at least a portion of the original source code program.

13. The method of claim 9, wherein the blockchain distributed ledger technology is implemented using a Hyperledger Fabric protocol.

14. The method of claim 9, wherein the blockchain distributed ledger technology may be either a centralized blockchain distributed ledger technology or a de-centralized blockchain distributed ledger technology.

15. The method of claim 9, wherein the AI platform is directed to a healthcare application.

16. A method comprising: receiving a copy of an original source code program, the original source code program for execution on an artificial intelligence platform, the artificial intelligence platform utilizing a blockchain distributed ledger technology comprising a plurality of blocks in the execution of the original source code program and wherein each respective one block of the plurality of blocks are linked cryptography and within each respective one block there is at least a respective one: block header, hash of a previous block, timestamp, nonce, hash of block data and plug-in, and wherein the respective plug-in is a smart contract executing on the blockchain distributed ledger technology and the blockchain distributed ledger technology may be either a centralized blockchain distributed ledger technology or a de-centralized blockchain distributed ledger technology, determining a total number of lines of source code in the original source code program; monitoring an execution of the original source code program within a black box of the artificial intelligence platform;

triggering an execution of the respective one plug-in within a respective one block of the plurality of blocks upon detection by the respective one plug-in triggered of at least one modification to the original source code program made during execution of the original code program within the block box of the artificial intelligence platform and identifying and tracking, using the respective one plug-in triggered within at least the respective one block of the plurality of blocks, the at least one modification to the original source code program made during execution of the original code program within the black box of the artificial intelligence platform, the at least one modification comprising either an addition or a deletion of a specific set of source code lines to the total number of lines of source code in the original source code program determined;

determining, based on the at least one modification detected, a total number of lines of source code in the specific set of source code lines added or deleted;

for the respective one block of the plurality of blocks having its respective one plug-in triggered, identifying descriptive information specific to the at least one modification to the original source code program made during execution of the original code program within the black box of the artificial intelligence platform, which caused the triggering of the respective one plug-in of the respective one block:

creating at least one storyboard using the descriptive information identified, wherein the at least one storyboard created comprises at least (i) an indication of where the at least one modification to the original source code program occurred in a data set, (ii) how did the least one modification to the original source code program occur, (iii) what changes occurred as a consequence of least one modification to the original source code program, and (iv) what results were caused by the least one modification to the original source code program;

assigning an integer label to the at least one modification detected;

creating a new block comprising at least the specific set of source code lines of the at least one modification detected: and adding the new block created to the plurality of blocks of the distributed ledger technology;

providing analytics on the at least one modification to the original source code program made during execution of the original code program within the black box of the artificial intelligence platform.

\* \* \* \* \*